United States Patent Office 3,256,233
Patented June 14, 1966

3,256,233
WATER-BASE COATING COMPOSITION OF EMULSIFIED POLYMER SOLIDS AND STYRENE-MALEIC INTERPOLYMER
Frank J. Hahn and John F. Heaps, Springfield, Mass., assignors to Monsanto Company, St. Louis, Mo., a corporation of Delaware
No Drawing. Filed Sept. 24, 1964, Ser. No. 399,105
5 Claims. (Cl. 260—29.6)

This application relates to water-base coating compositions which will air dry to provide glossy films.

This application is a continuation-in-part of copending application Serial No. 166,368, filed January 15, 1962, now abandoned.

The use of polymer latexes such as latexes of styrene-butadiene copolymers, polyvinyl acetate, acrylate ester polymers and the like in the manufacture of water-based coating compositions is well-known in the art. Each has enjoyed particular success in flat or low gloss latex paints of the type used for interior or exterior wall surfaces. Such usage has in general been in conjunction with thickeners such as cellulose ethers and water-soluble gums which function by a mechanism of polymer flocculation and entails a sacrifice in gloss.

It has been recognized as desirable to extend the use of latex paints into the gloss paint area. This has been attempted repeatedly without significant commercial success due to one or more of the following primary deficiencies; low gloss, poor hiding due to thin films, and poor application properties. To attain high gloss, good application properties and high hiding power it is recognized that the vehicle system employed must not be flocculated. It is also recognized that the pigment must be wetted initially with a polymer solution prior to contacting the remaining ingredients of the coating composition. While the functional requirements for water-based coating compositions which will dry to provide glossy films are known, to date the art has not been aware of any means for preparing such compositions without one or more of the above-named deficiencies.

It is an object of this invention to provide water-based coating compositions which will dry to provide glossy films.

Other objects and advantages of this invention will be apparent from the following detailed descriptions thereof.

The above and related objects are attained by providing water-based coating compositions which consist essentially of (1) water, (2) 100 parts by weight of emulsified polymer solids, (3) 6-36 parts by weight of an alkali soluble interpolymer of styrene and a maleic monomer of the group consisting of maleic anhydride, maleic acid, half esters of maleic acid and a 1-18 carbon atom monohydric alcohol and mixtures thereof, (4) 25-200 parts by weight of at least one pigment, and (5) an alkali in a quantity sufficient to provide a pH in the range of 8-12. At least 15% by weight of the emulsified polymer solids of components (2) consists of particular polymer particles which particles have an inner polymer composition with a polymer composition oriented to the surface of the polymer particles and wherein the polymer composition oriented to the surface contains about 18-75 weight percent of a polymerizable acid, e.g., acrylic acid with the balance thereof being at least one vinylidene monomer which is interpolymerizable with the acid. The inner polymer composition of the polymer particles contains at least 70 weight percent of either a homopolymer or an interpolymer of a vinylidene monomer. The emulsified polymer is further characterized by being selected so that the resulting polymer solids have a second order transition temperature not higher than about 50° C.

The following examples are set forth to illustrate more clearly the principle and practice of this invention to those skilled in the art. Unless otherwise noted, where parts or quantities are mentioned, they are parts or quantities by weight.

LATEX A

An approximately 45% solids latex of an interpolymer of 48.5% styrene, 39% 2-methyl hexyl acrylate, 6% acrylonitrile and 6.5% methacrylic acid is prepared by a modification of the process described in Example I of U.S. 2,767,153. The following solutions are prepared.

KETTLE CHARGE

| Component: | Parts |
|---|---|
| Water (distilled) | 402 |
| Triton X–100 [a] | 1.7 |
| Triton X–770 [b] | 1.2 |
| Tetrasodium pyrophosphate | 0.2 |

[a] An ethylene oxide condensate of nonylphenol.
[b] Sodium salt of an alkyl aryl polyether sulfate.

CATALYST AND EMULSIFIER PREMIX

| Component: | Parts |
|---|---|
| Water (distilled) | 132 |
| Triton X–100 | 0.5 |
| Triton X–770 | 10.7 |
| Potassium persulfate | 2.7 |

MONOMER CHARGE I

| Component: | Parts |
|---|---|
| Acrylonitrile | 24 |
| Styrene | 56 |

MONOMER CHARGE II

| Component: | Parts |
|---|---|
| Styrene | 138 |
| 2-ethylhexyl acrylate | 125 |

MONOMER CHARGE III

| Component: | Parts |
|---|---|
| 2-ethylhexyl acrylate | 31 |
| Methacrylic acid | 26 |

The kettle charge is added to a glass-lined reaction vessel that is fitted with a reflux condenser and a stirrer and is refluxed (at atmospheric pressure) for 15 minutes to deoxygenate the solution. There is then added to the reaction vessel 10 parts of the catalyst and emulsifier premix. The balance of the catalyst and emulsifier premix is added to the reaction vessel at a uniform rate of 1.3 parts per minute, the total time of addition being 100 minutes. As soon as the initial aliquot of the catalyst and emulsifier premix is added to the reaction vessel, Monomer Charge I is added to the reaction vessel at a uniform rate of 2 parts per minute, the time of addition for this monomer charge being about 30 minutes. Immediately thereafter, Monomer Charge II is added to the reaction vessel at a uniform rate of 5.5 parts per minute, the total time of addition of this monomer charge being about 50 minutes. Immediately thereafter, Monomer Charge III is added to the reaction vessel at a uniform rate of 5 parts per minute, the addition of Monomer Charge III requiring approximately 10 minutes. Reflux is continued for an additional 15 minutes to polymerize the final traces of monomers. Reflux is then continued for an additional 15 minutes and 60 parts of distillate are removed so as to remove by steam distillation any residual monomers present in the latex. The resulting latex is subsequently identified as Latex A.

The catalyst concentration and monomer addition times described in the paragraph above are selected so that the monomers polymerize at substantially the rate they are added to the reaction vessel. It will be specifically noted that the acid monomer, i.e., methacrylic acid, is not introduced into the polymerization reaction until approximately 85% of the total monomer charge has been polymerized. The amount of acid employed is about 45.5% of Monomer Charge III.

LATEX B

A 46% solids latex of an interpolymer of 35% butadiene, 60% styrene and 5% acrylic acid is prepared from the polymerization recipe set forth below.

| Component: | Parts |
|---|---|
| Water (distilled) | 120 |
| Butadiene | 35 |
| Styrene | 60 |
| Acrylic acid | 5 |
| Sodium stearate | 5 |
| Potassium persulfate | 2 |
| t-Dodecyl mercaptan | 0.2 |

The water and soap are charged to an autoclave and the resulting solution is boiled for 5 minutes to deoxygenate the water. Thereafter, all the remaining components of the polymerization recipe except for 10 parts of styrene monomer and 5 parts of acrylic acid are charged to the autoclave which is then sealed. The reaction mixture is heated to 50° C. and stirred until essentially all of the initially charged monomers have polymerized. Thereafter, the remaining styrene monomer and acrylic acid monomer are slowly charged to the reaction vessel with stirring. The acid monomer constitutes 33⅓% of the remaining monomer mixture added to the reaction vessel. The temperature is maintained at 50° C. until all of the monomers have polymerized. This latex is subsequently identified as Latex B.

LATEX C

A 46% solids latex of an interpolymer of 60% ethyl acrylate, 32% methyl methacrylate and 8% methacrylic acid is prepared employing the polymerization system set forth below.

| Component: | Parts |
|---|---|
| Water (distilled) | 120 |
| Ethyl acrylate | 60 |
| Methyl methacrylate | 32 |
| Methacrylic acid | 8 |
| Sodium stearate | 5 |
| Potassium persulfate | 1 |

The soap solution is prepared and boiled for 10 minutes to remove oxygen and then the remaining components of the recipe are charged except for 12 parts of ethyl acrylate and 8 parts of methacrylic acid. The reaction mixture is heated to reflux and agitated until all of the initial monomer charge has polymerized. Thereafter, the remaining 12 parts of ethyl acrylate and 8 parts acrylic acid, which acrylic acid constitutes 40% thereof, are slowly charged to the reaction mixture with agitation while maintaining reflux until all of the monomers have polymerized. This latex is subsequently identified as Latex C.

LATEX D

An approximately 46% solids latex of an interpolymer of 94% vinyl acetate and 6% crotonic acid is prepared employing the polymerization recipe below.

| Component: | Parts |
|---|---|
| Water (distilled) | 120 |
| Vinyl acetate | 94 |
| Crotonic acid | 6 |
| Sodium lauryl sulfate | 3 |
| Cumene hydroperoxide | 0.5 |

The surfactant solution is prepared as described in the preceding examples and thereafter all of the remaining components of the polymerization system are charged except for 9 parts of vinyl acetate and 6 parts of crotonic acid. The polymerization mixture is heated to 50° C. and agitated until all of the initially charged monomers are polymerized. Thereafter, the remaining 9 parts of vinyl acetate and 6 parts of crotonic acid are charged to the polymerization which is then carried to completion. It is specifically noted that the crotonic acid constitutes 40% of the remaining monomer charge. This latex is subsequently identified as Latex D.

Example I

A pigment paste is prepared by grinding on a 3-roll paint mill 44.4 lbs. of rutile titanium dioxide and 17 lbs. of an aqueous solution having dissolved therein 25% by weight of an ammonium salt of an equimolar interpolymer of styrene and the half secondary butyl ester of maleic acid, said interpolymer having a specific viscosity of about 1.3 as determined in a 15% solution of methyl ethyl ketone. To the resulting pigment paste is then added with stirring 34.6 lbs. of a 30% aqueous solution of the same ammonium salt of the equimolar interpolymer of styrene and the half secondary butyl ester of maleic acid. Thereafter there is added with stirring 38.5 lbs. of Latex A and 40 lbs. of an aqueous emulsion containing 43% of an ester formed from 41 parts of soya fatty acids and 59 parts of a styrene-allyl alcohol interpolymer. Finally, there is added to the composition with stirring 5 lbs. of hexamethylene glycol, 10 lbs. of water and a small quantity of a cobalt dryer sufficient to provide 0.02% cobalt ion based upon the soya fatty acid moiety of the styrene-allyl alcohol interpolymer ester.

The above prepared coating composition, when applied to a glass or smooth sealed wood surface and permitted to air dry for 24 hours, provides a film having a gloss of 74% as determined by the 60° Photovolt glossmeter. The leveling, hiding power, and the film thickness (per single applied coat) of the composition are materially superior to the water-based coating compositions heretofore reported in the art.

Examples II–IV

Example I is repeated except that Latex A is replaced with an equal quantity of, respectively, Latex B, Latex C and Latex D. Essentially comparable results are obtained.

The compositions of the invention contain a mixture of two types of film-forming polymers. The first type of film-former will consist of emulsified polymer solids. The second type of film-former will be an alkali soluble interpolymer of styrene and a maleic monomer which is employed in the ratio of 6–36, preferably 20–30 and more especially about 28 parts per 100 parts of the emulsified polymer solids.

The emulsified polymer solids will consist of a unique type of thermoplastic polymer latex solids, which can be employed either alone or preferably in admixture with other types of emulsified polymer solids. The particular latex component, when employed in admixture with other emulsified polymers, will constitute at least 15%, preferably 15–50% and more especially 20–35% by weight of the total emulsified polymers. The remainder of the emulsified polymer solids can be supplied by conventional aqueous dispersed film-forming thermoplastic polymers (in which the polymer has a second order transition temperature not higher than about 50° C.), drying oils, oil-modified alkyd resins, esters of styrene-allyl alcohol interpolymers, and the like.

The unique type of emulsified polymers employed in the practice of this invention is the emulsified polymer solids of (A) an alpha,beta-ethylenically unsaturated carboxylic acid, and (B) at least one vinylidene monomer wherein the polymer particles thereof comprise an inner polymer composition with a particular polymer composition oriented to the surface of the polymer particles. The specific configuration of the polymer particles employed in the practice herein can probably be visualized as having a shell-core configuration. The inner polymer composition of the polymer particles consists of at least 70 weight percent of a polymer selected from the group consisting of homopolymers and interpolymers of (B) based on the total weight of the polymer particles employed in preparing this unique polymer system. The particular polymer composition oriented to the surface of the polymer particles consists of an interpolymer of 18–75 weight percent of (A) based on the weight of the oriented polymer with the balance thereof being (B). In the practice of this invention it is critical that the polymer composition oriented to the surface of the polymer particles contain the proper weight percent of the carboxylic acid as indicated above. This critical feature is necessary in order to impart to the emulsified solids described above the property of thickening and increasing in viscosity when merely adjusting the pH thereof to 8–12 and preferably 8–10.

The acid monomers employed herein contain alpha, beta-ethylenic unsaturation and preferably a single carboxyl group. Typical examples of such preferred acid monomers are acrylic acid, methacrylic acid, crotonic acid, etc. Other acid monomers which can be employed include maleic acid, fumaric acid, itaconic acid, and half esters of maleic acid and fumaric acid such as monomethyl maleate, monobutyl maleate, monododecyl maleate, monobutyl fumarate, etc.

The vinylidene monomers employed herein and which can interpolymerize with the carboxylic acid monomer can be any vinylidene monomer such as mono- and diolefins, e.g., ethylene, propylene, isobutylene, butadiene, isoprene, etc.; vinyl halides, e.g., vinyl chloride, vinyl bromide, etc.; vinylidene halides, e.g., vinylidene chloride; esters of vinylidene monocarboxylic acids with 1–18 carbon atom monohydric alcohols, e.g., methyl acrylate, methyl alphachloroacrylate, butyl acrylate, benzyl acrylate, dodecyl acrylate, the corresponding esters of methacrylic acids, etc.; amides and nitriles of vinylidene monocarboxylic acids, e.g., acrylamide, methacrylamide, acrylonitrile, methacrylonitrile; vinylidene aromatic hydrocarbons and nuclear alkyl and halogen derivatives thereof, e.g., styrene, vinyl naphthalene, alpha-methylstyrene, vinyl toluene, 2,4-dimethylstyrene, o-, m-, p-chlorostyrene, 2,5-dichlorostyrene, 2-methyl-4-chlorostyrene, etc.; vinyl esters of 1–18 carbon atom monobasic acids, e.g., vinyl acetate, vinyl stearate, vinyl benzoate, etc. Diesters of maleic acid and fumaric acid with 1–18 carbon atom monohydric alcohols, while not vinylidene monomers in the strict sense of the word, can be used interchangeably therewith. Typical of such monomers are diethylene maleate, dibutyl fumarate, etc. In addition, mixtures of two or more of the above compounds can be used to prepare interpolymers thereof.

The monomers employed to provide the emulsified polymer particles having the particular makeup are monomers which will provide polymers having second order transition temperatures not higher than about 50° C. The selection of monomers meeting this requirement is well within the skills of the art. Typical monomer compositions which can be employed to prepare the unique latex component of the coating compositions of the present invention are set forth below:

(a) 80–95% methyl acrylate/5.5–20% acrylic and/or methacrylic acid, (b) 80–95% butyl acrylate/5.5–20% acrylic and/or methacrylic acid, (c) 25–65% styrene/3–10% acrylonitrile/35–60% 2-ethylhexyl acrylate/5.5–20% acrylic and/or methacrylic acid, (d) 25–60% styrene/3–10% acrylonitrile/35–60% dibutyl fumarate/5.5–20% acrylic and/or methacrylic acid, (e) 25–50% styrene/30–40% ethyl acrylate/5.5–20% acrylic and/or methacrylic acid, (f) 25–60% methyl methacrylate/3–10% acrylonitrile/35–60% 2-ethylhexyl acrylate/5.5–20% acrylic and/or methacrylic acid, (g) 80–95% vinyl acetate/5.5–20% acrylic and/or methacrylic acid, (h) 80–95% vinyl acetate/5.5–20% crotonic acid, (i) 20–95% butadiene/0–75% styrene/5.5–20% acrylic and/or methacrylic acid, (j) 20–95% butadiene/0–75% acrylonitrile/5.5–20% acrylic and/or methacrylic acid, (k) 20–95% butadiene/0–75% methyl methacrylate/5.5–20% acrylic and/or methacrylic acid, (l) 40–75% vinyl chloride/15–55% vinyl acetate/5.5–20% acrylic and/or methacrylic acid, (m) 40–75% vinyl chloride/15–55% ethyl acrylate/5.5–20% acrylic and/or methacrylic acid, (n) 40–75% vinyl chloride/15–55% dibutyl fumarate/5.5–20% acrylic and/or methacrylic acid.

Especially preferred interpolymer latexes to be included in the coating compositions of the present invention are prepared from monomers consisting of (1) about 25–60 and preferably about 40–60% styrene and/or alpha-methyl-styrene, (2) about 30–60 and preferably about 35–45% of an acrylate and/or methacrylate ester of 5–18 carbon atom monohydric alcohol such as hexyl acrylate, dodecyl acrylate, etc., and/or a diester of maleic acid or fumaric acid with a 1–18 carbon atom monohydric alcohol such as diethyl maleate or dibutyl fumarate, (3) about 2–20 and preferably about 3–10% of acrylonitrile or methacrylonitrile, and (4) about 5.5–20 and preferably about 8–15% of acrylic or methacrylic acid or mixtures thereof.

The monomers can be polymerized by any of the known emulsion polymerization processes provided only that the addition of a specific weight percent of the carboxylic acid monomer to the polymerization reaction is delayed until at least about 70% of the total monomers have been first polymerized. Of necessity, the monomers are charged to the polymerization reaction in two or more separate monomer charges. In the preferred embodiment herein, the vinylidene monomers, which constitute 70–90% of the total monomers are emulsified in water containing a polymerization initiator and polymerized. The acid monomer, in admixture with a small quantity of the vinylidene monomer, is then added to the polymerization medium and the polymerization is completed. In another variation of the polymerization process, the monomers are added continuously to the polymerization reaction at essentially the rate at which the acid monomers will polymerize.

In preparing the unique latex component from monomers of two or more vinylidene monomers, one of which normally gives polymers having a high second order transition temperature (e.g., styrene, acrylonitrile, or methyl methacrylate) and one of which normally gives polymers having low second order transition temperature (e.g., an alkyl acrylate, a dialkyl maleate or a dialkyl fumarate), it is preferred to employ a special modification of the continuous monomer addition process. Specifically, the vinylidene monomer giving polymers of high second order transition temperature should be charged first, followed by the vinylidene monomer giving polymers of low second order transition temperature and finally by the acid monomer. The preparation of Latex A illustrates this polymerization procedure. The coating compositions prepared from such latexes offer an optimum combination of ease of application, quick drying and film durability.

The emulsifying agents, polymerization initiators, polymerization modifiers, etc., that are employed in preparing the unique latex component of the coating compositions of the invention are those commonly used in known prior art emulsification polymerization processes.

The coating compositions of the invention will contain, per 100 parts of emulsified polymer solids, 25–200, preferably 50–150 and more especially 80–125 parts by weight of pigments of the type customarily employed in water-base coating compositions. Typical examples of such pigments include titanium dioxide, clay, iron oxide, barium sulfate, phthalocyamine blue and the like. Calcium carbonate and zinc oxide can under some conditions of storage react with the carboxyl groups of the unique latex component and, consequently, preferably should not be included in the compositions of the invention.

The alkali soluble interpolymer of the styrene and the maleic monomer can be an interpolymer of styrene with such monomers as maleic anhydride, maleic acid, monomethyl maleate, monobutyl maleate, monooctadecyl maleate, etc. The two monomer components will ordinarily be combined in essentially equimolar proportions, although the styrene monomer can be present in molar excess provided only that the maleic monomer is present in a quantity sufficient to render the interpolymer soluble in alkaline solutions. Usually, at least 25 mol percent of the maleic monomer is required to achieve this property. The interpolymers employed should preferably have a low molecular weight, e.g., less than 20,000, preferably less than 10,000 and more especially less than 5,000. These interpolymers and their method of preparation are known and reported in the art.

In a preferred embodiment, maximum gloss properties are achieved by, in formulating the coating compositions, first wetting the pigment(s) employed with at least a portion of the alkali soluble interpolymer to be employed, said alkali soluble interpolymer being an aqueous solution containing at least 15% by weight of alkali soluble interpolymer solids.

The coating compositions of the invention should contain sufficient alkali to adjust the pH of the compositions to the range of about 8–12. Although inorganic alkalies such as sodium hydroxide and the like can be employed to control the pH, it is preferred to employ a volatile nitrogenous base which has an atmospheric boiling point not substantially higher than about 175° C. Ammonia is the preferred volatile nitrogenous base to be used for this purpose, but it is also feasible to employ volatile amines such as methylamine, dimethylamine, trimethylamine, mono-, di-, and triethylamines, isopropylamine, butylamine, morpholine, pyridene, etc.

The coating compositions of this invention can be applied by conventional techniques to protect and decorate metal, e.g., steel, copper and aluminum, plaster, wooden plastic and like surfaces.

The above descriptions and particularly the examples are set forth for purposes of illustration only. Many variations and modifications thereof will be apparent to those skilled in the art and to be made without departing from the spirit and scope of the invention herein described.

What is claimed is:

1. A water-based coating composition which consists essentially of (1) water, (2) 100 parts by weight of emulsified polymer solids, (3) about 6–36 parts by weight of an alkali soluble interpolymer of styrene and a maleic monomer selected from the group consisting of maleic anhydride, maleic acid, half esters of maleic acid and a 1–18 carbon atom monohydric alcohol and mixtures thereof, (4) about 25–200 parts by weight of at least one pigment, and (5) sufficient alkali to provide a pH in the range of about 8–12; at least 15% by weight of the emulsified polymer solids of (2) being a thermoplastic polymer having a second order transition temperature not higher than about 50° C. and consisting of the emulsified polymer solids of (A) an alpha,beta-ethylenically unsaturated carboxylic acid, and (B) at least one vinylidene monomer, wherein the polymer particles thereof comprise an inner polymer composition with a particular polymer composition oriented to the surface of the particles; said inner polymer consisting of at least 70 weight percent based on the weight of the polymer particles of a polymer selected from the group consisting of homopolymers and interpolymers of (B) and said polymer oriented to the surface of the particles consisting of an interpolymer of 18–75 weight percent of (A) based on the weight of the said oriented polymer with the balance thereof being (B); said polymer particles having a particle size of 0.01–1.0 micron; said thermoplastic polymer consisting of the emulsified polymer solids of (a) about 25–60% by weight of a material selected from the group consisting of styrene and mixtures of styrene with alpha-methylstyrene, (b) about 30–60% by weight of at least one ester formed between a 1–18 carbon monohydric alcohol and an acid selected from the group consisting of acrylic acid and methacrylic acid and mixtures thereof, (c) about 2–20% by weight of a material selected from the group consisting of acrylonitrile, and methacrylonitrile, and mixtures thereof, and (d) about 5.5–20% by weight of an acid selected from the group consisting of acrylic acid and methacrylic acid, and mixtures thereof.

2. The water-based coating composition of claim 1 wherein the polymer oriented to the surface of the particles consists of an interpolymer of 20–65 weight percent of an alpha,beta-ethylenically unsaturated carboxylic acid selected from the group consisting of acrylic acid and methacrylic acid, and mixtures thereof with the balance being butadiene and styrene.

3. The composition of claim 1 wherein the inner polymer consists of 70–90 weight percent of a polymer selected from the group consisting of homopolymers and interpolymers of at least one vinylidene monomer.

4. The water-based coating composition of claim 1 wherein the inner polymer consists of an interpolymer of methyl methacrylate and ethyl acrylate.

5. The water-based coating composition of claim 1 wherein the alpha,beta-ethylenically unsaturated carboxylic acid is crotonic acid and the inner polymer consists of a homopolymer of vinyl acetate.

References Cited by the Examiner

UNITED STATES PATENTS

| | | | |
|---|---|---|---|
| 2,647,094 | 7/1953 | Hahn | 260—901 |
| 2,837,444 | 6/1958 | Hahn | 260—29.6 |
| 2,962,465 | 11/1960 | Lindstrom et al. | 260—29.6 |
| 2,963,452 | 12/1960 | Sinn et al. | 260—29.6 |
| 2,972,592 | 2/1961 | Brown et al. | 260—29.6 |

MURRAY TILLMAN, *Primary Examiner.*

WILBERT J. BRIGGS, Sr., *Assistant Examiner.*